(12) United States Patent
Itagi et al.

(10) Patent No.: US 9,230,582 B2
(45) Date of Patent: Jan. 5, 2016

(54) PLASMONIC FUNNEL FOR FOCUSED OPTICAL DELIVERY TO A MAGNETIC MEDIUM

(71) Applicant: Seagate Technology LLC, Cupertino, CA (US)

(72) Inventors: Amit Vasant Itagi, Eden Prairie, MN (US); Jie Zou, Eden Prairie, MN (US); Kaizhong Gao, Eden Prairie, MN (US); Michael Allen Seigler, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/505,771

(22) Filed: Oct. 3, 2014

(65) Prior Publication Data

US 2015/0016234 A1    Jan. 15, 2015

Related U.S. Application Data

(62) Division of application No. 13/403,049, filed on Feb. 23, 2012, now abandoned.

(51) Int. Cl.
| | |
|---|---|
| *G11B 5/48* | (2006.01) |
| *G11B 5/127* | (2006.01) |
| *G11B 5/60* | (2006.01) |
| *G02B 6/12* | (2006.01) |
| *G02B 6/122* | (2006.01) |

(Continued)

(52) U.S. Cl.
CPC .......... *G11B 5/4866* (2013.01); *G02B 6/12002* (2013.01); *G02B 6/1226* (2013.01); *G02B 6/4291* (2013.01); *G11B 5/1278* (2013.01); *G11B 5/6088* (2013.01); *G02B 2006/121* (2013.01); *G11B 2005/0021* (2013.01)

(58) Field of Classification Search
CPC ................. G11B 2005/0024; G11B 2005/001; G11B 13/08; G11B 5/187; G11B 7/00; G11B 7/1387; G11B 11/10536; G11B 33/144; G11B 5/127; G11B 5/1272; G11B 5/6088; G02B 6/1226; G02B 6/1228; G02B 6/24; G02B 5/008; G02B 6/10; G02B 6/12007; G02B 6/12004; G02B 2006/12083; G02B 6/14; G02B 7/00; G02B 6/00
See application file for complete search history.

(56) References Cited

U.S. PATENT DOCUMENTS

| 7,106,935 B2 | 9/2006 | Challener |
|---|---|---|
| 7,272,079 B2 | 9/2007 | Challener |
| 7,330,404 B2 | 2/2008 | Peng et al. |

(Continued)

FOREIGN PATENT DOCUMENTS

| CN | 101436409 A | 5/2009 |
|---|---|---|
| CN | 101784926 A | 7/2010 |

OTHER PUBLICATIONS

European Search Report issued in European Application No. EP 13154972, mailed Jun. 26, 2013, 6 pages.

*Primary Examiner* — Dionne H Pendleton
(74) *Attorney, Agent, or Firm* — HolzerIPLaw, PC (57) ABSTRACT

An apparatus includes a transducer including a plasmonic funnel having first and second ends with the first end having a smaller cross-sectional area than the second end, and a first section positioned adjacent to the first end of the plasmonic funnel, and a first waveguide having a core, positioned to cause light in the core to excite surface plasmons on the transducer.

16 Claims, 7 Drawing Sheets

(51) Int. Cl.
  *G02B 6/42* (2006.01)
  *G11B 5/00* (2006.01)

(56) References Cited

U.S. PATENT DOCUMENTS

| | | | |
|---|---|---|---|
| 7,440,660 B1 | 10/2008 | Jin et al. | |
| 8,437,230 B2 | 5/2013 | Aoki et al. | |
| 2003/0059147 A1* | 3/2003 | Berini | 385/2 |
| 2010/0024192 A1 | 2/2010 | Blauvelt et al. | |
| 2010/0046083 A1 | 2/2010 | Peng | |
| 2010/0111475 A1 | 5/2010 | Lu | |
| 2010/0123965 A1 | 5/2010 | Lee et al. | |
| 2010/0188768 A1 | 7/2010 | Itagi | |
| 2010/0328806 A1 | 12/2010 | Sasaki et al. | |
| 2011/0170381 A1 | 7/2011 | Matsumoto | |
| 2011/0181979 A1* | 7/2011 | Jin et al. | 360/59 |
| 2011/0222184 A1 | 9/2011 | Komura et al. | |
| 2012/0008229 A1* | 1/2012 | Zhou et al. | 360/59 |
| 2012/0063278 A1* | 3/2012 | Hirata et al. | 369/13.33 |

* cited by examiner

PLASMONIC FUNNEL FOR FOCUSED OPTICAL DELIVERY TO A MAGNETIC MEDIUM

CROSS-REFERENCE TO RELATED APPLICATIONS

The present application is a divisional application of U.S. patent application Ser. No. 13/403,049 entitled "Plasmonic Funnel for Focused Optical Delivery to a Metallic Medium" and filed Feb. 23, 2012, which is specifically incorporated by references for all that it discloses or teaches.

BACKGROUND

Heat assisted magnetic recording (HAMR) generally refers to the concept of locally heating a recording medium to reduce the coercivity of the medium so that an applied magnetic writing field can more easily direct the magnetization of the medium during the temporary magnetic softening of the medium caused by the heat source. The heated area in the storage layer determines the data bit dimension. A tightly confined, high power light spot is used to heat a portion of the recording medium to substantially reduce the coercivity of the heated portion. Then the heated portion is subjected to a magnetic field that sets the direction of magnetization of the heated portion. In this manner the coercivity of the medium at ambient temperature can be much higher than the coercivity during recording, thereby enabling stability of the recorded bits at much higher storage densities and with much smaller bit cells. Heat assisted magnetic recording is also referred to a thermally assisted magnetic recording.

Near-field transducers can be used to focus light to a small spot. An efficient means for concentrating light with a near-field transducer would be beneficial in HAMR recording heads.

SUMMARY

In one aspect, the disclosure provides an apparatus including a transducer including a plasmonic funnel having first and second ends with the first end having a smaller cross-sectional area than the second end, and a first section positioned adjacent to the first end of the plasmonic funnel, and a first waveguide having a core, positioned to cause light in the core to excite surface plasmons on the transducer.

These and other features and advantages which characterize the various embodiments of the present disclosure can be understood in view of the following detailed description and the accompanying drawings.

DETAILED DESCRIPTION

In one aspect, this disclosure provides an apparatus for focusing light to a small spot. In one embodiment, light is focused from a first waveguide to a recording medium such that the focused spot is much smaller than the diffraction limit.

Figure 1:
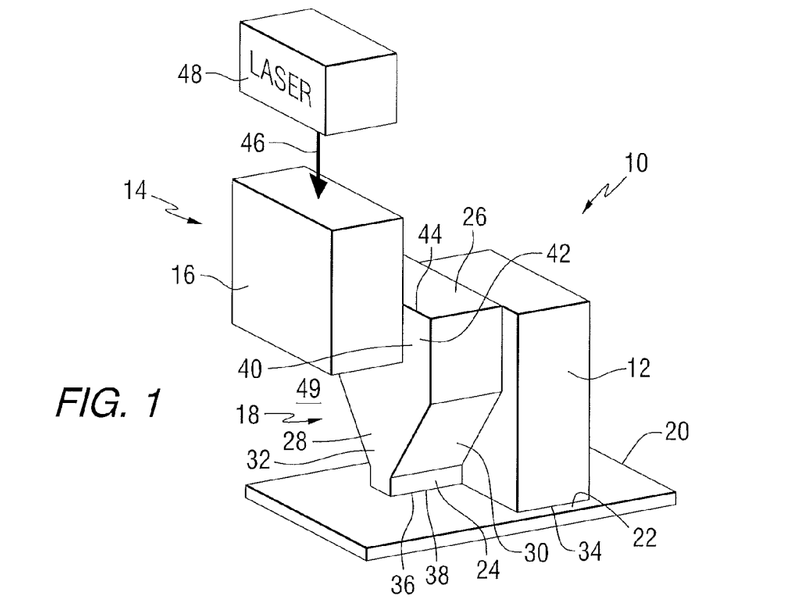
FIG. 1 is a schematic representation of portions of a recording head including an embodiment.

FIG. 1 is a schematic representation of a portion of a recording head 10 that may be used in a heat assisted magnetic storage device. The recording head includes a first magnetic pole 12, which in this example is a write pole, a first waveguide in the form of a dielectric channel waveguide 14 that includes a core layer 16, and a tapered block plasmonic transducer 18 positioned between a portion of the core layer of the waveguide and the pole. The core is positioned to cause light in the core to excite surface plasmons on the transducer. The core of the dielectric channel waveguide has a substantially rectangular cross-sectional shape in this example. The recording head is positioned adjacent to a data storage medium 20, which can be a metallic medium. The recording head may be separated from the storage medium by an air bearing 22.

In the example of FIG. 1, the plasmonic transducer includes a first section 24 (also referred to as a plasmonic waveguide or strip) having a substantially rectangular cross-sectional shape and having substantially straight sides that lie in planes substantially perpendicular to a plane of the storage medium; a second section 26 (also referred to as a second plasmonic waveguide or strip) having a substantially rectangular cross-sectional shape and having substantially straight sides that lie in planes substantially perpendicular to a plane of the storage medium; and a plasmonic funnel section 28 positioned between the first and second plasmonic waveguides. The plasmonic funnel section includes a first (or bottom) end positioned adjacent to the first section, and a second (or top) end positioned adjacent to the second section, with the cross-sectional area of the first end being smaller than the cross-sectional area of the second end.

The plasmonic funnel transducer serves as a near-field transducer (NFT) and includes a tapered section that is tapered to concentrate plasmons in a direction toward the first plasmonic waveguide. In this example, the plasmonic funnel section includes two substantially flat sides that are tilted to form edges that meet edges of the sides of the first and second plasmonic waveguides, and two other substantially flat sides that lie in planes that are substantially perpendicular to the plane of the storage medium and form edges that meet edges of the sides of the first and second plasmonic waveguides. In FIG. 1 only one tilted side 30 and only one flat side 32 of the tapered portion are visible. An end 34 of the pole and an end 36 of the plasmonic transducer are positioned adjacent to an air bearing surface 38 of the recording head.

A portion 40 of the dielectric channel waveguide core is positioned adjacent to a side 42 of the second plasmonic waveguide such that light in the waveguide core is evanescently coupled to the plasmonic transducer. A gap 44 can be provided between portion 40 and the side 42. The adjacent portions of the dielectric channel waveguide core and the side of the second plasmonic waveguide form a dielectric waveguide mode to plasmonic mode coupler. In operation, light 46 from a light source such as a laser 48, propagates through the dielectric channel waveguide and excites local surface plasmons on the plasmonic transducer. Plasmons are concentrated by the plasmonic funnel as they travel from the second plasmonic waveguide (i.e., the second section of the transducer) to the first plasmonic waveguide (i.e., the first section of the transducer).

Light in the dielectric channel waveguide propagates through the dielectric channel waveguide in an incident mode. The plasmonic transducer 18 is positioned next to the core of the dielectric channel waveguide. The tapered block plasmonic funnel and the first and second plasmonic waveguides are made of a plasmonic material. The plasmonic material can be, for example, gold, silver, copper, aluminum, or alloys of these materials.

The magnetic write pole 12 is placed behind (or adjacent to) the tapered block plasmonic transducer. The pole can be straight as shown in FIG. 1, or in other embodiments, the pole can be sloped toward the plasmonic funnel, or stacked. The region 49 surrounding the transducer, waveguide core, and magnetic pole of FIG. 1 can be filled with a dielectric material, that can serve as cladding layers for the dielectric waveguide. The dielectric material can be, for example, silica, silicon oxynitride, alumina, tantala, magnesium oxide, silicon nitride, or titania. In the example of FIG. 1, both the first and second plasmonic waveguides have a rectangular cross-sectional shape in a plane substantially parallel to the plane of the recording medium.

Figure 2:
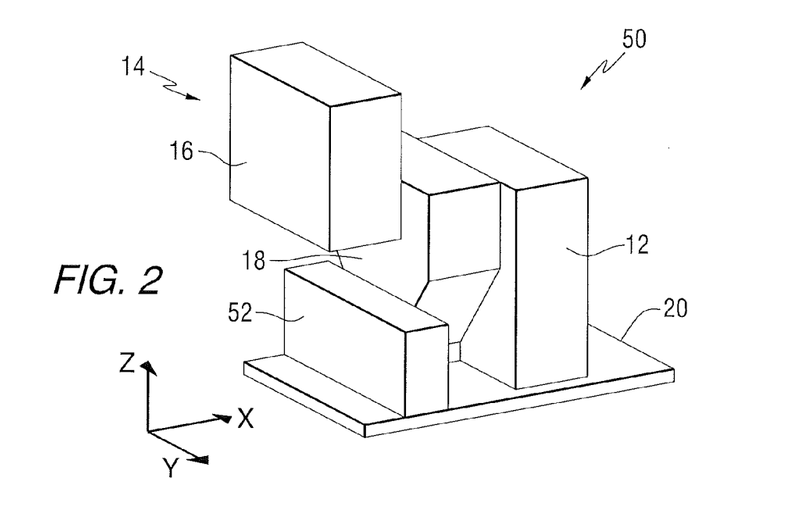
FIG. 2 is a schematic representation of portions of another recording head including an embodiment.

FIG. 2 is a schematic representation of portions of another recording head 50, which includes many of the elements of the recording head of FIG. 1, and further includes a plasmonic shield 52 that is positioned adjacent to a side of the first section of the plasmonic funnel transducer opposite the first magnetic pole.

Figure 3:
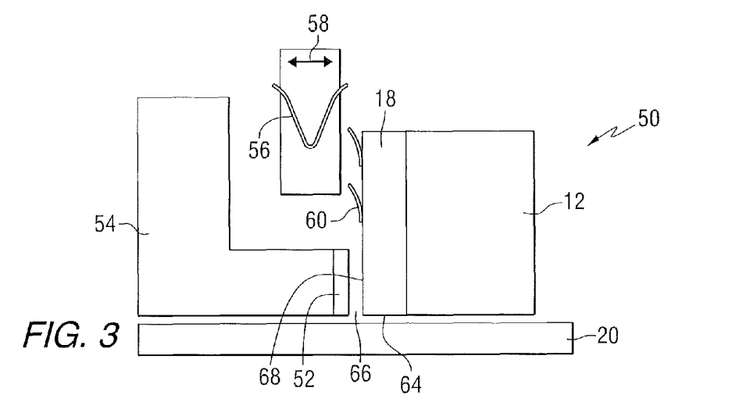
FIG. 3 is a cross-sectional view of FIG. 2 with an additional magnetic pole.

FIG. 3 is a cross-sectional view of the recording head of FIG. 2 showing a second magnetic pole 54. In this example, light illustrated by a wavefront 56 travels through the dielectric channel waveguide core in a transverse magnetic (TM) waveguide mode, with an electric field oriented as shown by arrow 58. This light excites surface plasmons 60 on the tapered block plasmonic funnel transducer. The recording head is spaced from the data storage medium by an air bearing 62. The plasmons are concentrated by the plasmonic funnel into a small spot adjacent to an air bearing surface 64 of the recording head.

The plasmonic front shield is shown to be positioned in front of the plasmonic funnel transducer in FIG. 3. There is a small gap 66 between the plasmonic funnel and the front shield. The gap can be filled with dielectric materials of various refractive indices. Such dielectric materials include, for example, silica, silicon oxynitride, alumina, tantala, magnesium oxide, silicon nitride, or titania. The material selection can be based on the optical spot size created by the NFT, optical loss in the NFT, and/or the efficiency of coupling to the media.

The magnetic writer has two poles. The first (or main) pole 12 is shown in FIG. 2. The second pole 54 can either be placed behind the main pole, or in front of the plasmonic front shield, and in contact with plasmonic front shield, as shown in FIG. 3. The roles of the main pole and the second pole can be reversed in the sense that either one can be made narrower than the other in the cross-track direction (i.e., the Y-direction).

The plasmonic shield reduces the dissipation of the plasmonic mode into the magnetic poles and reduces the optical spot curvature in the medium. In addition, the front shield screens the second pole from the plasmonic fields.

FIG. 3 can be used to explain the operation of the device. Initially, light propagates in a TM mode in the dielectric channel waveguide core. The electric field polarization direction is shown in FIG. 3. The energy in this mode is transferred into a surface plasmonic mode that runs along the face/edge 68 of the tapered block plasmonic funnel transducer. As the mode propagates towards the storage medium, the mode confinement becomes smaller and smaller due to the taper in the plasmonic funnel. Finally, the funnel ends in a narrow straight strip 36 (referred to as the first section or the first plasmonic waveguide in FIG. 1). The strip can be long enough (in a direction substantially perpendicular to the storage medium) so that the fringing field at the junction between the tapered funnel portion and the straight strip do not interact with the medium. This ensures a low sensitivity to lapping during fabrication of the recording head. Due to light delivery constraints, it might be easier to launch a transverse electric (TE) mode in the dielectric channel waveguide. In this case, the TE mode can be converted to the surface plasmon mode on the edge of the plasmonic funnel in the same manner as with the TM mode in FIG. 3, or the TE dielectric channel waveguide mode can be converted into a TM dielectric channel waveguide mode as described below.

Figure 4:
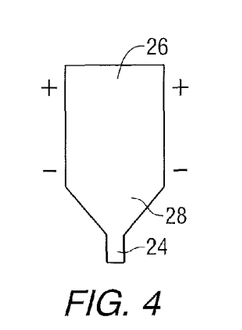
FIGS. 4-8 are schematic cross-sectional views of several examples of plasmonic funnels.
Figure 5:
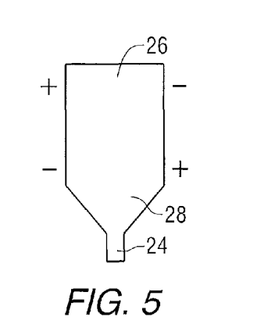
Figure 6:
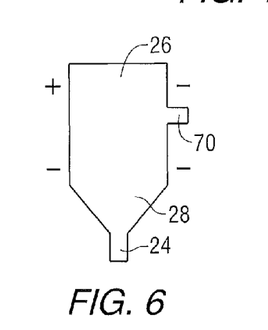
Figure 7:
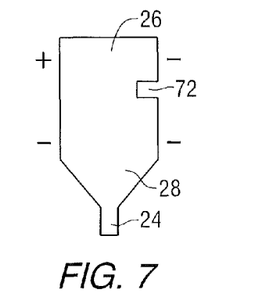
Figure 8:
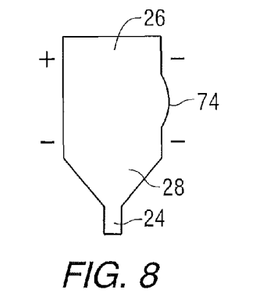

FIG. 4 shows the desired phase of the surface plasmon mode on the plasmonic funnel, with plus and minus signs illustrating relative phase. If a TE mode is converted to the surface plasmon mode on the edge of the tapered block plasmonic funnel transducer, the plasmon mode will have an opposite phase on either side of the plasmonic funnel transducer, as illustrated in FIG. 5. This will not produce a confined optical spot under the plasmonic funnel transducer at the recording medium. To correct for this phase difference, a 180° phase shift can be introduced on one side of the plasmonic funnel. This can be achieved by using a tuning stub 70 as shown in FIG. 6, or by extending the path on one side to obtain the desired optical path difference between the two sides. The path can alternatively be extended by a groove 72 in one side as shown in FIG. 7, or by a protrusion 74 on one side as shown in FIG. 8.

Figure 9:
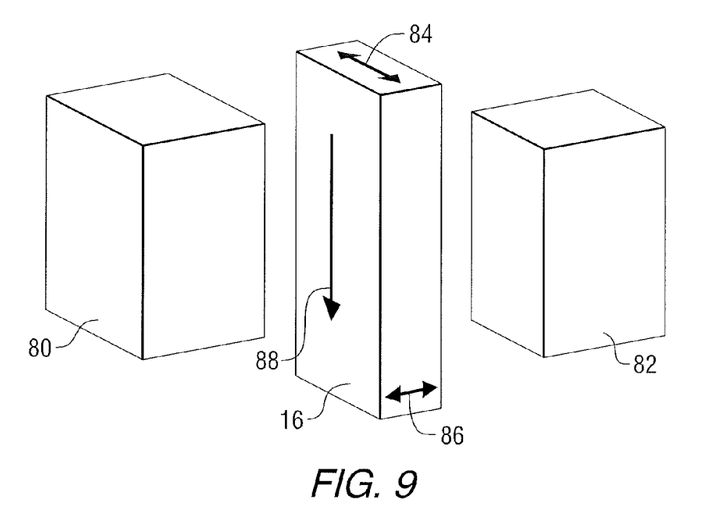
FIGS. 9 and 10 are schematic representations of a portion of a dielectric channel waveguide and a mode converter in an embodiment.
Figure 10:
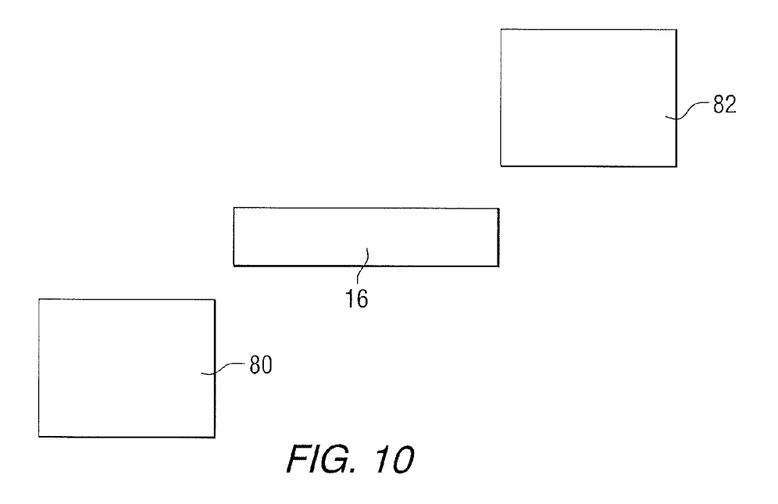

In another example, the TE dielectric channel waveguide mode can be converted into a TM dielectric channel waveguide mode using a previously known technique in which two plasmonic studs of appropriate length are placed diagonally with respect to the core of the dielectric channel waveguide. A structure for implementing this approach is shown in FIGS. 9 and 10, wherein FIG. 9 is a side view and FIG. 10 is a cross-sectional view. Two plasmonic studs 80 and 82 are placed at diagonally opposite positions with respect to the channel waveguide core. This introduces a cross-talk between the TE and the TM modes. By choosing a suitable length of the studs, the light that is launched as a TE mode can be converted to a TM mode. The incident electric field component of the light is shown as arrow 84 and the exiting electric field component of the light is shown as arrow 86. Light travels in the direction of arrow 88.

Alternatively, the mode coupling method of surface plasmon launching can be replaced with an end fire method. In the method discussed above, the energy transfer takes place across a gap between a portion of the core of the dielectric waveguide and the plasmonic funnel transducer. Alternatively, these modes can be launched using end-fire coupling. The end fire method can be implemented using the structure shown in FIG. 11.

Figure 11:
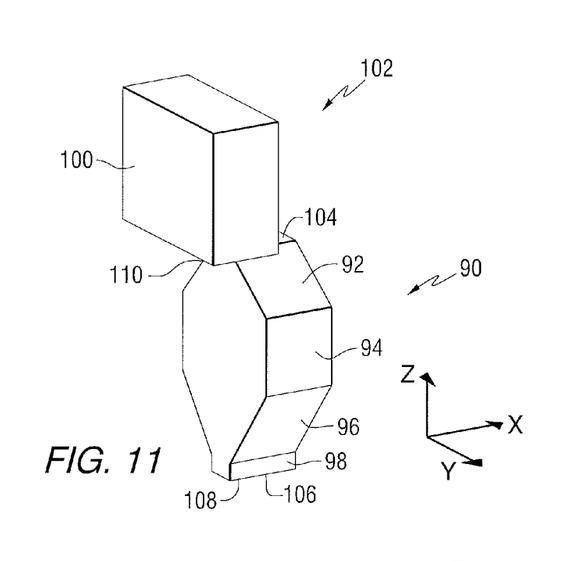
FIG. 11 is a schematic representation of portions of another recording head including an embodiment.

FIG. 11 shows a plasmonic funnel transducer 90 including a first tapered section 92, a center section 94 having a substantially rectangular cross-sectional shape, a second tapered section 96 and a strip section 98 having a substantially rectangular cross-sectional shape. A core layer 100 of a dielectric channel waveguide 102 overlaps an end 104 of the plasmonic funnel transducer in the downtrack direction (i.e., the X-direction). When used in a recording head, the end 106 of the second rectangular section would be positioned adjacent to an air bearing surface 108. A small vertical gap 110 (normal to the air bearing surface of the recording head) can be included between the plasmonic funnel and the channel waveguide core. The funnel in FIG. 11 is tapered at the top to provide for a gradual mode transfer from the dielectric channel waveguide to the plasmonic funnel. With the top taper in place, the small vertical gap 110 can be reduced to zero or be made negative (i.e. the plasmonic funnel can be penetrated by the waveguide core).

Figure 12:
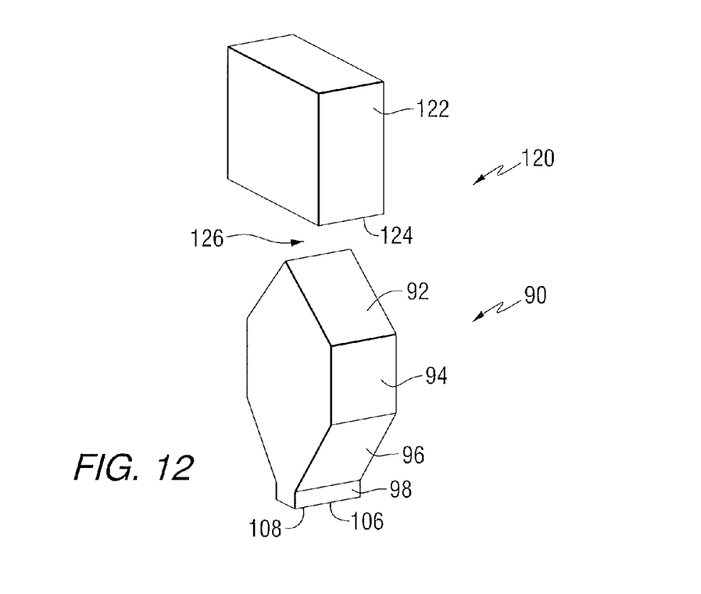
FIG. 12 is a schematic representation of portions of another recording head including an embodiment.

FIG. 12 is a schematic representation of portions of another recording head 120. The recording head of FIG. 12 includes a plasmonic funnel transducer 90 as shown in FIG. 11, in combination with a channel waveguide core 122. The waveguide core is vertically aligned with the plasmonic funnel transducer such that light exiting the end 124 of the core is end fire coupled to the plasmonic funnel transducer. The end of the core can be separated from the plasmonic funnel transducer by a gap 126. Alternatively, the end 124 can be in contact with the plasmonic funnel transducer or embedded in it.

Figure 13:
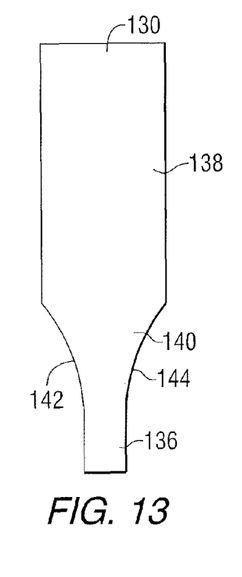
FIGS. 13-15 are schematic cross-sectional views of several examples of plasmonic funnels.
Figure 14:
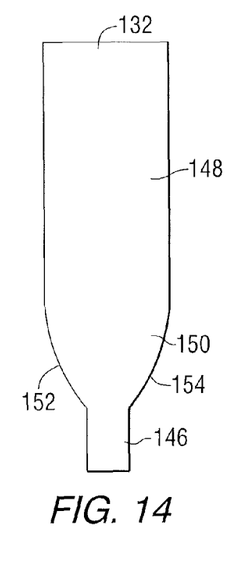
Figure 15:
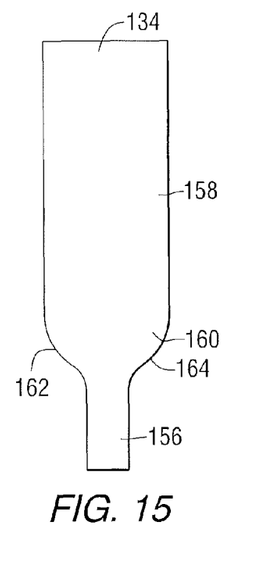

FIGS. 13-15 are schematic cross-sectional views of several examples of plasmonic funnel transducers 130, 132 and 134. Plasmonic funnel transducer 130 includes a first plasmonic waveguide 136 and a second plasmonic waveguide 138. A tapered section 140 is positioned between the first and second plasmonic waveguides. The tapered section includes concave sides 142 and 144. The first and second plasmonic waveguides, and the tapered section, can have generally rectangular cross-sectional shapes in planes perpendicular to the plane of the drawing. In various embodiments, the tapered section can include two concave sides and two flat sides, or four concave sides.

Plasmonic funnel transducer 132 includes a first plasmonic waveguide 146 and a second plasmonic waveguide 148. A tapered section 150 is positioned between the first and second plasmonic waveguides. The tapered section includes convex sides 152 and 154. The first and second plasmonic waveguides, and the tapered section, can have generally rectangular cross-sectional shapes in planes perpendicular to the plane of the drawing. In various embodiments, the tapered section can include two convex sides and two flat sides, or four convex sides.

Plasmonic funnel transducer 134 includes a first plasmonic waveguide 156 and a second plasmonic waveguide 158. A tapered section 160 is positioned between the first and second plasmonic waveguides. The tapered section includes convex sides 162 and 164. The first and second plasmonic waveguides, and the tapered section, can have generally rectangular cross-sectional shapes in planes perpendicular to the plane of the drawing. In various embodiments, the tapered section can include two convex sides and two flat sides, or four convex sides.

Figure 16:
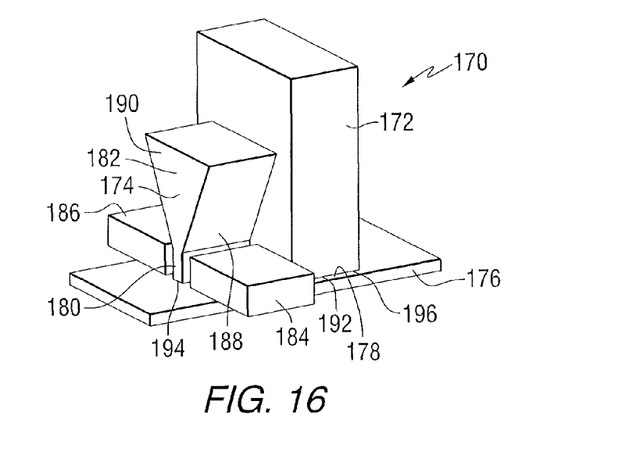
FIG. 16 is a schematic representation of portions of another recording head including an embodiment.

FIG. 16 is a schematic representation of portions of another recording head 170. The recording head includes a first magnetic pole 172, which in this example is a write pole and a plasmonic funnel transducer 174 positioned adjacent to the pole. The recording head is positioned adjacent to a data storage medium 176. The recording head may be separated from the storage medium by an air bearing 178.

In the example of FIG. 16, the plasmonic funnel transducer includes a first plasmonic waveguide 180 having a substantially rectangular cross-sectional shape and having substantially straight sides that lie in planes substantially perpendicular to a plane of the storage medium and a tapered funnel portion 182 positioned above the first plasmonic waveguide. Plasmonic side shields 184 and 186 are positioned on opposite sides of the first plasmonic waveguide and adjacent to the air bearing surface of the recording head.

The plasmonic funnel is tapered to concentrate plasmons in a direction toward the first plasmonic waveguide. In this example, the plasmonic funnel includes two substantially flat sides that are tilted to form edges that meet edges of the sides of the first plasmonic waveguide, and two other substantially flat sides that lie in planes that are substantially perpendicular to the plane of the storage medium and form edges that meet edges of the sides of the first plasmonic waveguides. In FIG. 16 only one tilted side 188 and only one flat side 190 of the tapered portion are visible. An end 192 of the pole and an end 194 of the plasmonic transducer are positioned adjacent to an air bearing surface 196 of the recording head. In another embodiment, the side shields can be used in combination with a front shield as shown in FIG. 2.

Figure 17:
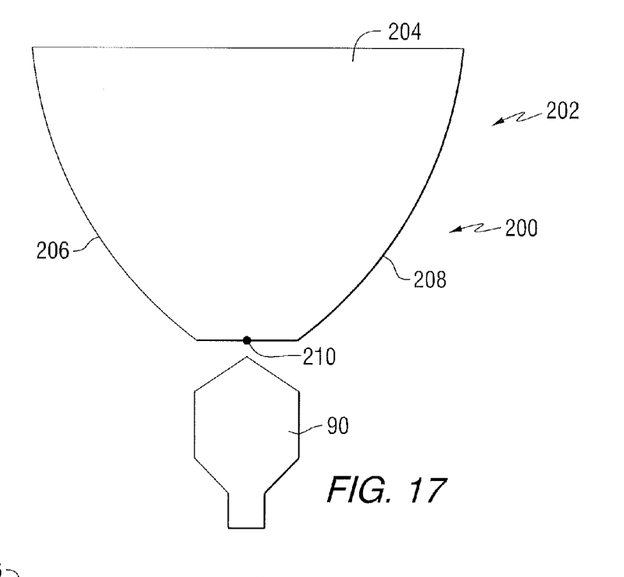
FIG. 17 is a schematic representation of portions of another recording head including an embodiment.

FIG. 17 is a schematic representation of portions of another recording head 200. The recording head of FIG. 17 includes a planar waveguide 202 in the form of solid immersion mirror (SIM) having a core layer 204. The sides 206 and 208 of the solid immersion mirror are shaped to direct light in the core to a focal point 210. The core layer is positioned such that light exiting the core layer excites surface plasmons on the plasmonic funnel transducer 90. The SIM core layer can be vertically aligned with the plasmonic funnel transducer for end fire coupling, or the core can be offset from the plane of the plasmonic funnel transducer for evanescent coupling.

Figure 18:
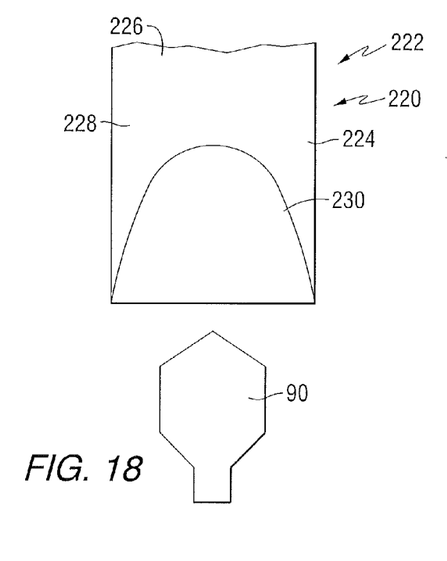
FIG. 18 is a schematic representation of portions of another recording head including an embodiment.

FIG. 18 is a schematic representation of portions of another recording head 220. The recording head of FIG. 18 includes a waveguide 222 in the form of mode index lens 224 having a core layer 226 with a first region 228 and a second region 230 having a thickness larger than the thickness of the first region. The edge of the second region is shaped to direct light in the core to a focal point 230. The mode index lens is positioned such that light exiting the core layer excites surface plasmons on the plasmonic funnel transducer 90. The mode index lens can be vertically aligned with the plasmonic funnel transducer for end fire coupling, or it can be offset from the plane of the plasmonic funnel transducer for evanescent coupling.

Figure 19:
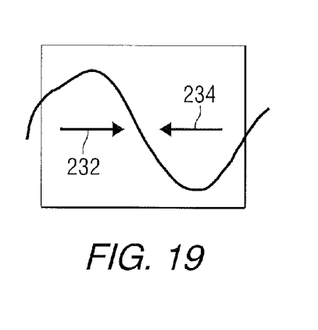
FIG. 19 is a graph of an electric field component of light in the waveguide of FIG. 18.

FIG. 19 is a graph of an electric field component of light in the waveguide of FIG. 18. To obtain the desired phase of light exiting the mode index lens, the electric field component of light region 228 can be asymmetric with respect to the center of the mode index lens in a plane perpendicular to the plane of the drawing. The desired electric field is shown in the region between the arrows 232 and 234 in FIG. 19. If the desired phase is not obtained in this manner, the tuning stubs shown in FIGS. 9 and 10 could be used to obtain the desired phase.

In FIGS. 1-18, only selected components of the apparatus are shown. It will be apparent to those skilled in the art that other components can be included in a practical device. For example, the components in FIGS. 1-18 can be embedded in or surrounded by material, which may be dielectric material, that supports the illustrated components and maintains the relative position of the illustrated components.

Figure 20:
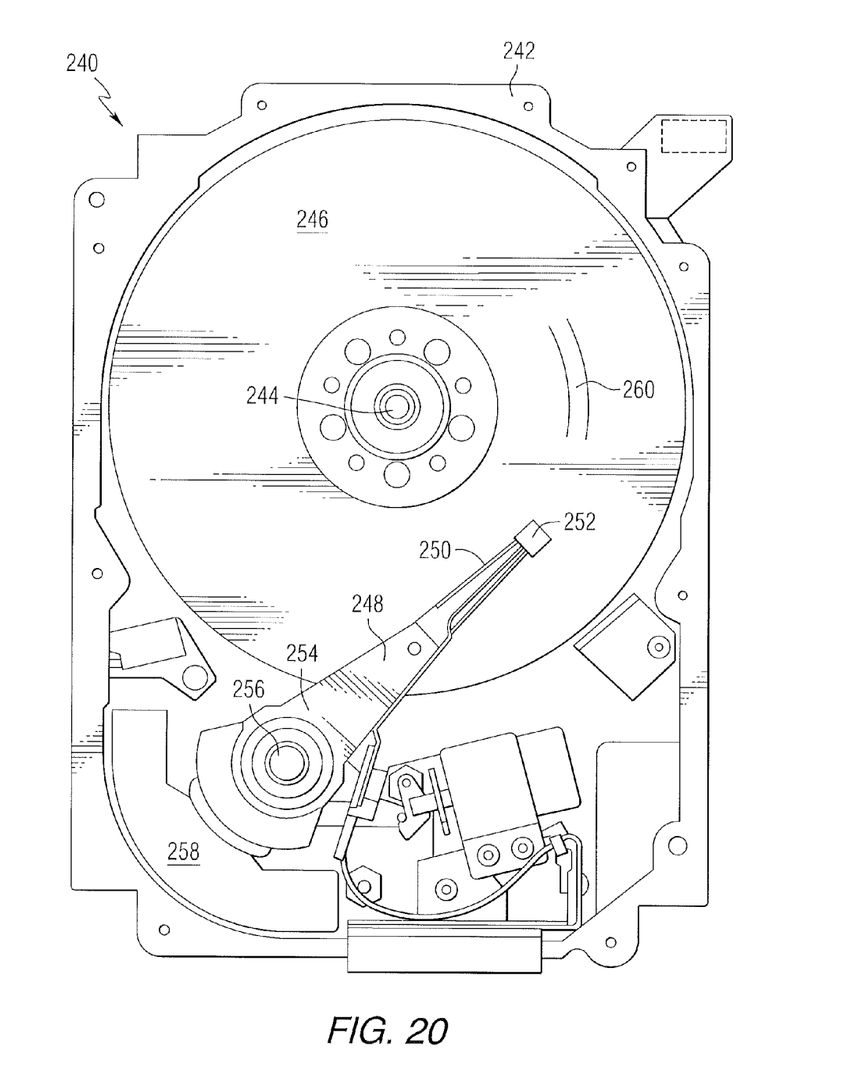
FIG. 20 is a pictorial representation of a data storage device in the form of a disc drive that can include a recording head in accordance with an aspect of this disclosure.

FIG. 20 is a pictorial representation of a magnetic storage device in the form of a disc drive that can include a recording head constructed in accordance with the disclosure. The disc drive 240 includes a housing 242 (with the upper portion removed and the lower portion visible in this view) sized and configured to contain the various components of the disc drive. The disc drive 240 includes a spindle motor 244 for rotating at least one storage medium 246, which may be a magnetic recording medium, within the housing 242. At least one arm or other positioning device 248 is contained within the housing 242, with each arm 248 having a first end 250 with a recording head or slider 252, and a second end 254 pivotally mounted on a shaft by a bearing 256. An actuator motor 258 is located at the arm's second end 254 for pivoting the arm 248 to position the recording head 252 over a desired sector or track 260 of the disc 246. The actuator motor 258 is regulated by a controller, which is not shown in this view and is well-known in the art.

For heat assisted magnetic recording (HAMR), an electromagnetic wave of, for example, visible, infrared or ultraviolet light is directed onto a surface of a data storage medium to raise the temperature of a localized area of the medium to facilitate switching of the magnetization of the area. The recording head can include a laser, channel waveguide, and plasmonic funnel transducer as shown in FIGS. 1-18 on a slider to guide light to the storage medium for localized heating of the storage medium.

The various examples described above include a dielectric waveguide mode to plasmonic mode coupler, a plasmonic funnel transducer, and a narrow plasmonic waveguide or strip positioned adjacent to a tapered section. An optional polarization rotator can also be included. The apparatus can be used for light delivery in heat assisted magnetic recording. It can also be used in other applications that require coupling between two waveguides.

In one aspect, the disclosure provides a transducer including a plasmonic funnel including first and second ends with the first end being narrower than the second end, a first plasmonic waveguide positioned adjacent to the first end of the plasmonic funnel, and a second plasmonic waveguide positioned adjacent to the second end of the plasmonic funnel, wherein a phase changing element is positioned along a side of the second plasmonic waveguide. The phase changing element can be, for example, a stub, an indent, or a protrusion.

In another aspect, the disclosure provides an apparatus including a recording medium; a recording head having a transducer including a plasmonic funnel having first and second ends with the first end having a smaller cross-sectional area than the second end, and a first section positioned adjacent to the first end of the plasmonic funnel, and a first waveguide having a core, with a portion of the core positioned to cause light in the core to excite surface plasmons on the transducer; and a positioning means for positioning the recording head adjacent to the storage medium. A portion of the first waveguide core can be positioned adjacent to a side of the transducer such that light in the waveguide core is evanescently coupled to the transducer. The transducer can also include a second section positioned adjacent to the second end of the plasmonic funnel. An end of the first waveguide core can be positioned adjacent to an end the transducer such that light in the waveguide core is end fire coupled to the transducer.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. An apparatus comprising:
    a transducer including a plasmonic funnel including a first tapered section with first and second ends with the first end having a smaller cross-sectional area than the second end, and a second tapered section tapered in a direction opposite the first tapered section, the second tapered section separated from the second end of the first tapered section along an axis substantially perpendicular to an air bearing surface (ABS) of a recording medium; and
    a first waveguide having a core, the waveguide positioned to cause light in the core to excite surface plasmons on the transducer.

2. The apparatus of claim 1, wherein a portion of the core of the first waveguide is positioned adjacent to a side of the transducer such that light in the core is evanescently coupled to the transducer.

3. The apparatus of claim 1, wherein an end of the core of the first waveguide is positioned adjacent to an end the transducer such that light in the core is end fire coupled to the transducer.

4. The apparatus of claim 1, wherein the first waveguide comprises one of:
    a channel waveguide, a solid immersion mirror, or a mode index lens.

5. The apparatus of claim 1, further comprising:
    a first magnetic pole positioned adjacent to a side of a first section of the transducer, the first section positioned adjacent to the first end of the first tapered section.

6. The apparatus of claim 1, wherein the second tapered section is separated from the second end of the first tapered section by a center section having a substantially rectangular cross-sectional shape.

7. The apparatus of claim 1, further comprising: a phase changing element positioned along a side of the second section.

8. The apparatus of claim 7, wherein the phase changing element comprises one of: a stub, an indent, or a protrusion.

9. An apparatus comprising:
    a recording medium;
    a recording head having a transducer including:
    a plasmonic funnel having a first tapered section with first and second ends with the first end having a smaller cross-sectional area than the second end, and
    a second tapered section tapered in a direction opposite the first tapered section, the second tapered section separated from the second end of the first tapered section along an axis substantially perpendicular to an ABS of the recording medium; and
    a first waveguide having a core, positioned to cause light in the core to excite surface plasmons on the transducer; and
    a positioning means for positioning the recording head adjacent to the storage medium.

10. The apparatus of claim 9, wherein a portion of the core of the first waveguide is positioned adjacent to a side of the transducer such that light in the waveguide core is evanescently coupled to the transducer.

11. The apparatus of claim 9, wherein an end of the core of the first waveguide is positioned adjacent to an end of the transducer such that light in the first waveguide core is end fire coupled to the transducer.

12. The apparatus of claim 9, wherein the second tapered section is separated from the second end of the first tapered section by a center section having a substantially rectangular cross-sectional shape.

13. The apparatus of claim 9, further comprising: a phase changing element positioned along a side of the second section.

14. The apparatus of claim 13, wherein the phase changing element comprises one of: a stub, an indent, or a protrusion.

15. An apparatus comprising:
   a transducer including a plasmonic funnel including a first tapered section with first and second ends with the first end having a smaller cross-sectional area than the second end, and a second tapered section tapered in a direction opposite the first tapered section, the second tapered section separated from the second end of the first tapered section along an axis substantially perpendicular to an ABS of a recording medium, wherein the second tapered section is separated from the second end of the first tapered section by a center section having a rectangular cross-sectional shape.

16. The apparatus of claim 15, wherein the phase changing element comprises one of:
   a stub, an indent, or a protrusion.

\* \* \* \* \*